July 22, 1958     H. VOGLER     2,844,004
SYSTEM FOR STARTING FORCED FLOW STEAM GENERATORS
INCLUDING A PLURALITY OF RESUPERHEATERS
Filed June 1, 1954
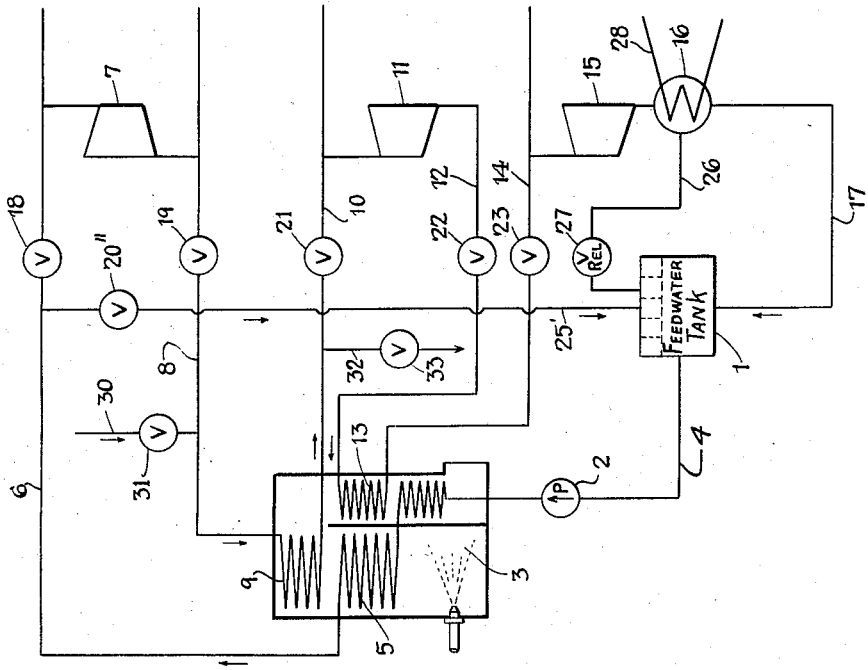
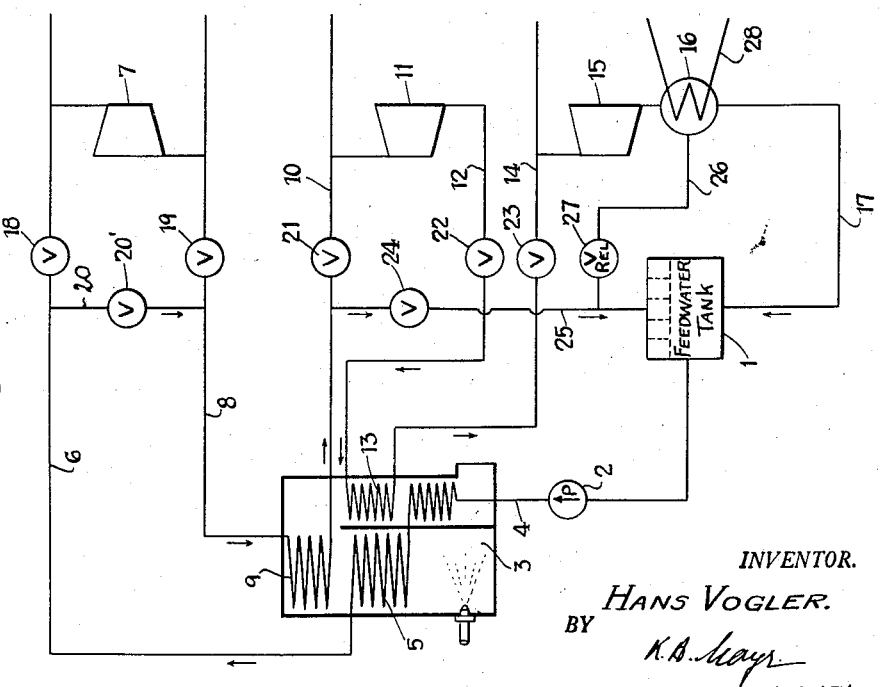
INVENTOR.
HANS VOGLER.
BY
K.B. May
ATTORNEY.

United States Patent Office 2,844,004
Patented July 22, 1958

2,844,004

SYSTEM FOR STARTING FORCED FLOW STEAM GENERATORS INCLUDING A PLURALITY OF RESUPERHEATERS

Hans Vogler, Winterthur, Switzerland, assignor to Sulzer Freres, Societe Anonyme, Winterthur, Switzerland, a corporation of Switzerland Application June 1, 1954, Serial No. 433,746

Claims priority, application Switzerland August 31, 1953

3 Claims. (Cl. 60—73)

The present invention relates to a method and apparatus for starting a forced flow steam generator including a plurality of intermediate or resuperheaters heated by the same combustion gases as the generator.

It is an object of the invention to provide a system for starting a forced flow steam generator, particularly one producing steam of at least the critical pressure and temperature and including a plurality of resuperheaters placed in the path of the combustion gases heating the generator, the resuperheaters which are exposed to radiant heat and the resuperheaters receiving heat by convection immediately after the radiation part of the generator being cooled during the starting-up period, and the other resuperheaters not being cooled during the starting of the generator. It is recommended to take the coolant for the resuperheaters from the steam generator. Preferably, the steam generated during the starting period is used as coolant. Alternatively, steam or water from other sources may be used as a coolant.

It is conventional to cool the superheater and a convection heated resuperheater in a forced flow steam generator by passing the operating liquid of the generator through the superheater and through the resuperheater from the beginning of the starting operation of the generator. Convection heated resuperheaters are sometimes cooled by filling the resuperheaters with water and evaporating the water during the starting period, as is conventional in the case of boilers having a drum. This, however, calls for special starting maneuvers which are relatively complicated and difficult to perform.

The aforementioned difficulties and disadvantages are avoided with the system according to the invention. When starting a forced flow steam generator including several resuperheaters according to the invention, the resuperheaters exposed to radiant heat and to convection immediately after the combustion chamber are cooled and the other resuperheaters are not cooled during the starting period. In this way, the starting maneuvers are simplified and the operating safety is increased because faulty connections are avoided.

The novel features which are considered characteristic of the invention are set forth with particularity in the appended claims. The invention itself, however, and additional objects and advantages thereof will best be understood from the following description of embodiments thereof when read in conjunction with the accompanying drawing, in which—

Fig. 1 illustrates diagrammatically the connections of a plant including a steam generator according to the invention;

Fig. 2 is a diagrammatic layout of a modified plant according to the invention.

Referring more particularly to the drawing, numeral 1 designates a starting-up tank from which feed water is supplied to a forced flow steam generator 3 by means of a pump 2 through a conduit 4. After passing through a superheater 5, the steam flows through a conduit 6 to consumers, for example to a high pressure turbine 7, and therefrom, through a conduit 8, to a resuperheater 9 which is exposed to radiant heat. A conduit 10 conducts the resuperheated steam to a medium pressure turbine 11. The exhaust steam of the latter flows through a conduit 12, a resuperheater 13, which receives heat by convection, and a conduit 14 to a low pressure turbine 15. Thereupon, the steam is condensed in a condenser 16 and conducted therefrom through a conduit 17 to the starting tank 1.

When the forced flow steam generator is started, the high pressure turbine 7 is disconnected by closing valves 18 and 19, the steam flowing through a conduit 20 and a valve 20' arranged therein, from the superheater 5 to the resuperheater 9, cooling the latter. By closing valves 21, 22, and 23, the medium pressure turbine 11, the low pressure turbine 15, and the resuperheater 13 are cut off from the steam supply, the steam being returned through a conduit 25 to the starting tank 1 after opening a valve 24. To prevent building up pressure in the tank 1, the latter is connected with the condenser by means of a conduit 26 in which an overflow valve 27 is provided. The coolant for the condenser 16 is supplied through a conduit 28.

The starting arrangement illustrated in Fig. 1 of the drawing in which the most heated resuperheater is cooled by a liquid or steam, and in which the other resuperheater is dry, requires a minimum of operating instructions because only a few valves must be operated. Since the second resuperheater (13) is heated by gas of a temperature which is considerably lower than the temperature to which the resuperheater 9 is exposed, the resuperheater 13 need not be cooled during the starting-up period.

In steam generators including only one resuperheater, the high pressure superheater is cooled during the starting of the plant by passing water through the superheater, whereas the resuperheater which is exposed to much lower combustion gas temperatures is dry, i. e. not cooled, when the plant is started. Also, according to the invention, the high pressure superheater or the first of a plurality of resuperheaters or all resuperheaters may be started dry, provided that the thermal load on the superheaters is maintained sufficiently low during the starting. If all superheaters are disconnected from the circuit of the operating liquid, the by-pass conduit is connected with the outlet of the steam generator 3 or, if all resuperheaters are to be disconnected, a by-pass conduit is connected with the inlet of the first resuperheater, the by-pass conduits terminating in the starting tank 1.

Whereas in the aforedescribed systems the coolant for the first resuperheater is taken from the steam generator, for example, in steam state, steam or water may be taken from other sources without departing from the scope of the invention. Such a system is illustrated in Fig. 2. Conduit 8 receives steam or water from an outside source through a conduit 30 and a valve 31. The steam or water is removed from the system through a conduit 32 and a valve 33 therein. The water or steam produced during the starting-up period in the tube system 5 is returned to the hot well 1 through a conduit 25' which is controlled by a valve 20''.

The system according to the invention is not only suitable for starting steam generators, but can also be used when operating the steam generator at very low load. Starting resuperheaters dry greatly facilitates operation, particularly in plants in which steam is produced at super-critical pressure and at a very high temperature, and in which usually two resuperheaters are provided.

While specific embodiments of the invention have been shown and described, it will be apparent to those skilled

What is claimed is:

1. A forced flow steam generator for producing steam of at least the critical pressure including a combustion gas passage having zones of different temperatures, steam generating and superheating tubes located in said gas passage, a plurality of resuperheaters for reheating steam at different pressures, said resuperheaters individually being placed in different temperature zones of said combustion gas passage, a first conduit interconnecting the outlet of said superheating tubes with the inlet of that one of said resuperheaters which is located in the relatively hottest zone of said gas passage, a second conduit connecting the outlet of said resuperheater which is located in the relatively hottest zone of said gas passage with the inlet of said steam generating tubes, said second conduit by-passing at least one of said resuperheaters which is located in a relatively cold zone of said gas passage, and control valves in said conduits for closing said conduits during normal operation of the steam generator and for opening said conduits during starting of the steam generator.

2. In a steam power plant having a plurality of turbines operating at different steam pressures, a forced flow steam generator for producing steam of at least the critical pressure, said steam generator including a combustion gas passage having zones of different temperatures, steam generating tubes and steam superheating tubes located in said gas passage, said steam generating tubes having an inlet, said superheating tubes being connected with said generating tubes for receiving steam therefrom and having an outlet, a steam main connecting the outlet of said superheater with a first one of said turbines, a plurality of resuperheaters individually interposed for steam flow between said turbines and being individually placed in different temperature zones of said combustion gas passage, a first conduit by-passing said first turbine and interconnecting said steam main with the inlet of that one of said resuperheaters which is located in the relatively hottest zone of said gas passage, a second conduit connecting the outlet of said resuperheater which is located in the relatively hottest zone of said gas passage with the inlet of said steam generating tubes, said second conduit by-passing said turbines except said first turbine and by-passing at least one of said resuperheaters which is located in a relatively cold zone of said gas passage, and control valves in said conduits for closing said conduits during normal operation of the steam generator and for opening said conduits during starting of the steam generator.

3. In a steam power plant having a plurality of turbines operating at different steam pressures and arranged in series relation with respect to the flow of the steam, a forced flow high pressure steam generator including a combustion gas passage having zones of different temperatures, steam generating tubes and steam superheating tubes located in said gas passage, said superheating tubes being connected with said generating tubes for receiving steam therefrom and having an outlet, a steam main connecting said outlet with that one of said turbines which operates at the highest pressure, a plurality of resuperheaters individually interposed for steam flow between said turbines and being individually placed in different temperature zones of said combustion gas passage, a coolant supply conduit connected with the inlet of that one of said resuperheaters which is located in the relatively hottest zone of said gas passage, a coolant discharge conduit connected with the outlet of said resuperheater which is located in the relatively hottest zone of said gas passage, control valves in said conduits for closing said conduits during normal operation of the steam generator and for opening said conduits during starting and low load operation of the steam generator, conduit means interconnecting said steam main with the inlet of said steam generating tubes and by-passing said turbines and said resuperheaters, and valve means in said conduit means for closing said conduit means during normal operation of the steam generator and for opening said conduit means during starting of the steam generator.

References Cited in the file of this patent
UNITED STATES PATENTS

| | | |
|---|---|---|
| 2,064,444 | Mosshart et al. | Dec. 15, 1936 |
| 2,065,782 | Wood | Dec. 29, 1936 |